R. BARBOUR.
INTERNAL COMBUSTION ENGINE.
APPLICATION FILED MAY 20, 1915.

1,249,588.

Patented Dec. 11, 1917.
3 SHEETS—SHEET 1.

INVENTOR
Robert Barbour
BY
John W. Copeland
ATTORNEY

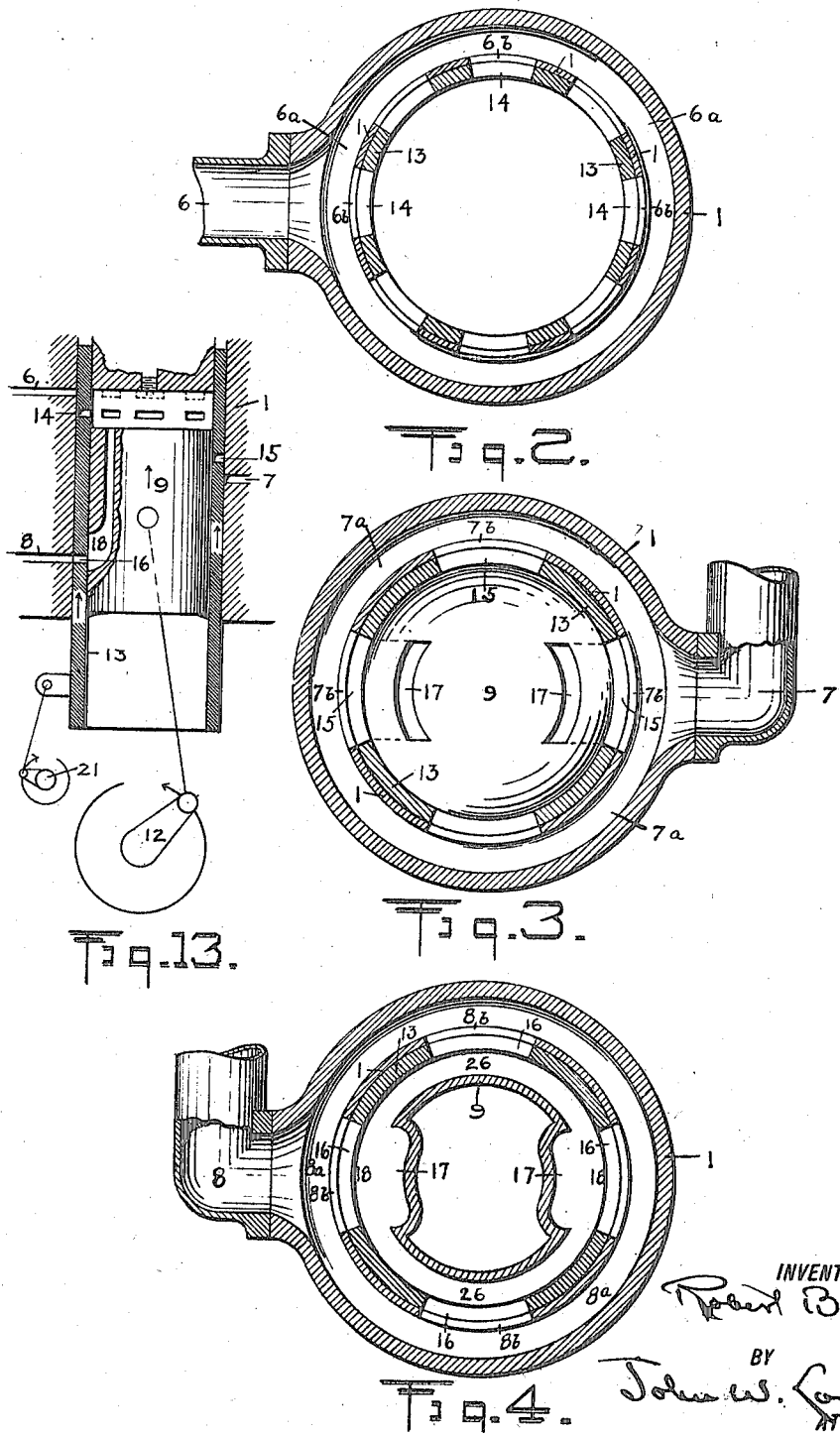

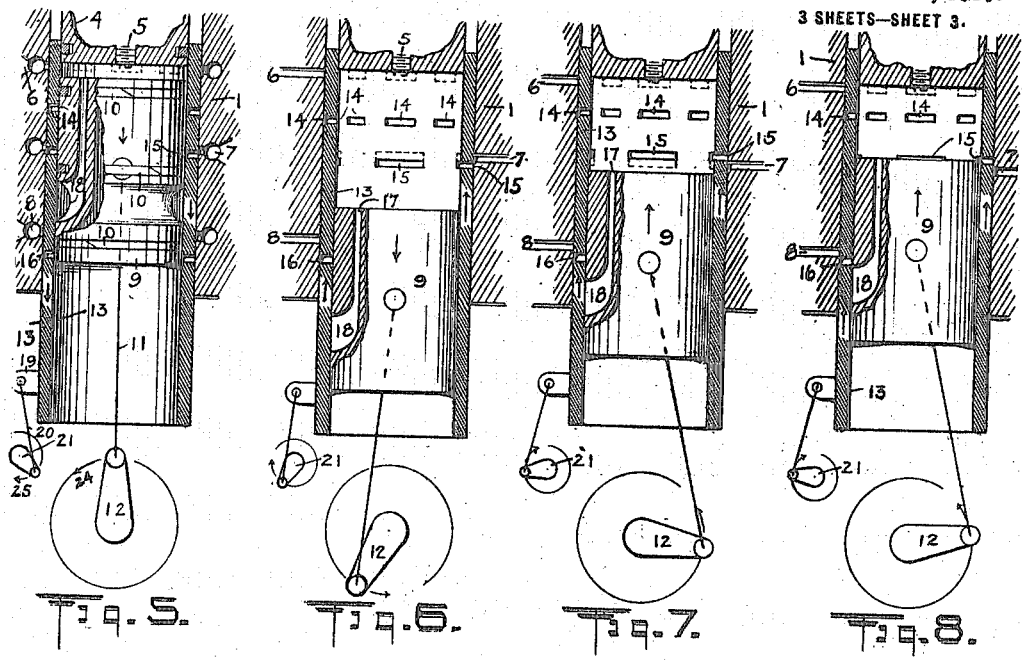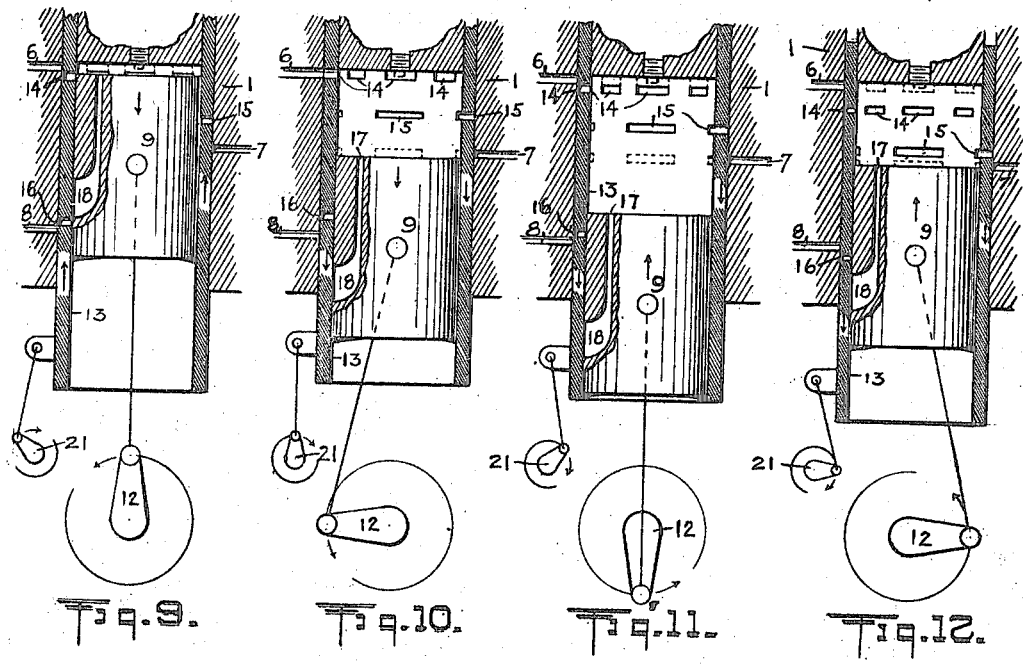

UNITED STATES PATENT OFFICE.

ROBERT BARBOUR, OF PATERSON, NEW JERSEY.

INTERNAL-COMBUSTION ENGINE.

1,249,588. Specification of Letters Patent. Patented Dec. 11, 1917.

Application filed May 20, 1915. Serial No. 29,277.

*To all whom it may concern:*

Be it known that I, ROBERT BARBOUR, residing at #64 Prince street, Paterson, in the county of Passaic, State of New Jersey, have invented a certain new and useful Internal-Combustion Engine, of which the following is a full, clear, and exact specification.

My invention relates to improvements in internal combustion engines in which a sleeve reciprocates within the main cylinder of the engine, and relative to and surrounding the piston thereof, being itself provided with ports and forming with the piston and external cylinder, means for controlling the inlet and outlet of gases.

My invention further relates more particularly to engines of the four cycle type, though it may be employed in a two cycle engine.

The objects of my invention are first, to provide efficient means for properly exhausting or scavenging burned gases from the cylinder; second, to provide an engine which shall permit of high speed, and which shall be simple in construction and operation; third, to promote facility and completeness of lubrication, to reduce the number of moving parts, to reduce the noise of operation, to secure an increase in power and the reduction of friction, and in general to increase the simplicity, efficiency and economy of operation.

I accomplish these objects by the mechanism illustrated in the accompanying drawings in which similar symbols of reference refer to similar parts throughout the respective views.

Fig. 2 is a horizontal cross section on the line $x$—$x$ Fig. 1 when the parts are in position shown in Fig. 10.

Fig. 3 is a horizontal cross section on the line $y$—$y$ Fig. 1 when the parts are in position shown in Fig. 1.

Fig. 4 is a horizontal cross section on the line Z—Z Fig. 1, when the parts are in the position shown in Fig. 13 the piston being shown in horizontal cross section on the line O—O Fig. 1.

Fig. 5 is a diagrammatical section in elevation of my device at the beginning of the explosion or working stroke at about the moment of firing, showing all ports closed.

Fig. 6 is a diagrammatical section in elevation of my device near the bottom of the explosion stroke, showing the first stage of the exhaust about to begin.

Fig. 7 is a diagrammatical section in elevation of my device at about midway of the exhaust stroke, showing the first stage of the exhaust just ended.

Fig. 8 is a diagrammatical section in elevation of my device at a farther point of the exhaust stroke, showing the auxiliary or second stage of the exhaust just beginning.

Fig. 9 is a diagrammatical section in elevation of my device at the beginning of the inlet stroke, showing the gas inlet passages just opening, and secondary exhaust just closed.

Fig. 10 is a diagrammatical section in elevation of my device at about one half of the suction stroke, showing gas inlet passage wide open.

Fig. 11 is a diagrammatical section in elevation at the beginning of the compression stroke, showing all ports closed.

Fig. 12 is a diagrammatical section in elevation of my device at about the middle of the compression stroke, and having nearly completed the last fourth of the cycle.

Fig. 13 is a diagrammatical section in elevation of my device, showing a stage between those shown in Figs. 8 and 9, that is to say when the second or auxiliary exhaust ports are wide open.

Figure 1:
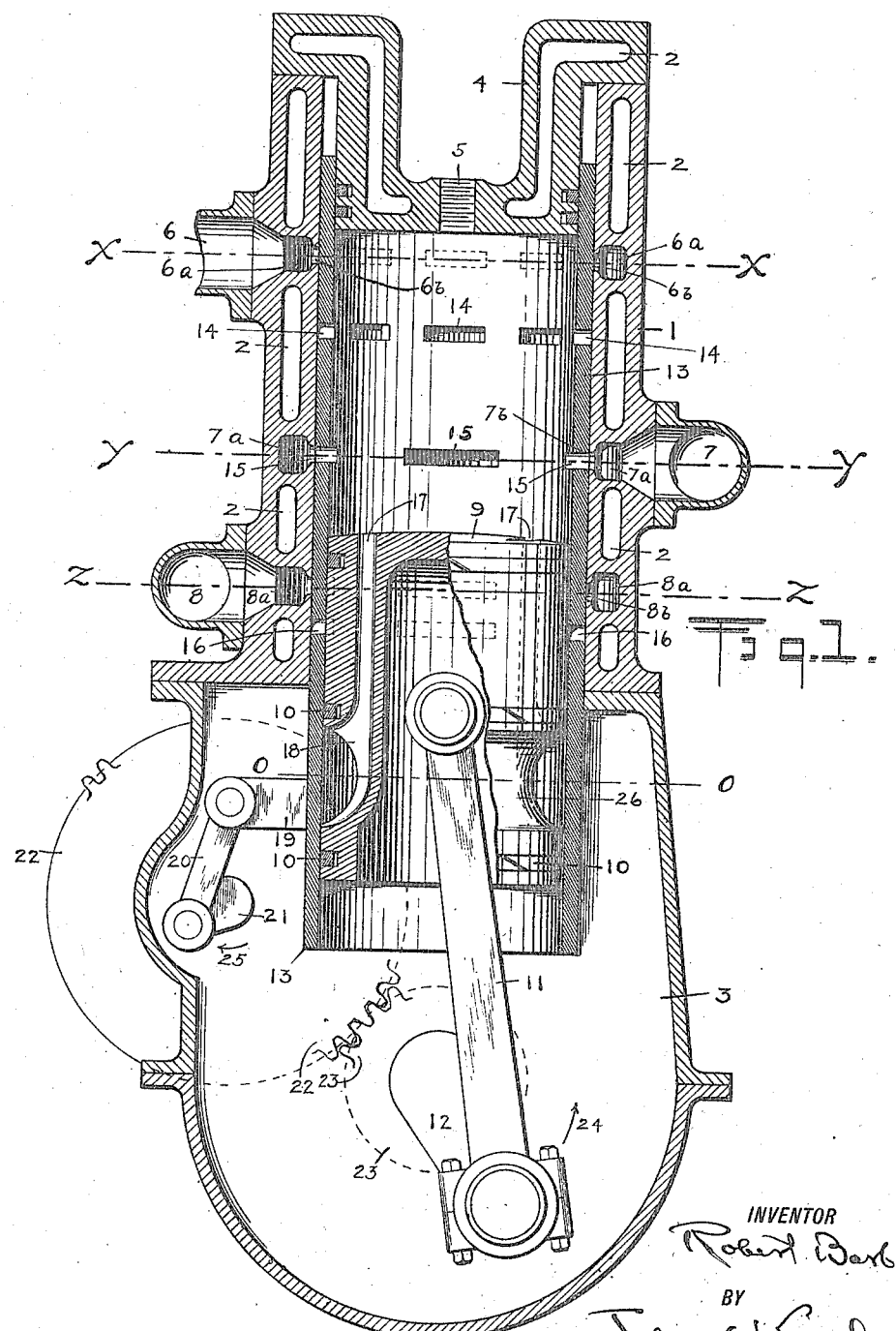
Figure 1 is a central vertical section at a right angle to the crank shaft, the piston being shown partly in elevation.

In Figs. 6 to 13 inclusive I have shown the different ports in one side only of the sections of sleeve and cylinder,—to avoid complicating the drawings, as those are merely diagrams to show steps of operation rather than forms of construction.

Referring to the figures, 1 is a cylinder provided with the usual water jacket spaces 2, 3 is the crank case, 4 the cylinder head, 5 the spark plug aperture.

6 is the inlet orifice in the cylinder, $6^a$ is an annular space preferably surrounding the cylinder with which the inlet orifice 6 communicates, and which itself communicates with the interior of the cylinder through ports $6^b$ (see Fig. 2).

7 is the primary exhaust orifice, $7^a$ an annular space (similar to 6ª) with which the main exhaust orifice 7 communicates and which itself communicates with the interior of the cylinder through ports 7ᵇ, (see Fig. 3).

8 is a supplementary exhaust orifice, 8ª an annular space surrounding the cylinder similar to the spaces 6ª and 7ª, 8 communicates with this space and the space itself communicates with the interior of the cylinder through ports 8ᵇ as shown in Fig. 4. It will be understood that while I have shown the annular spaces or passages 6ª, 7ª and 8ª extending entirely around the cylinder I do not consider this an essential part of my invention, as I may increase or diminish the number of ports leading into the cylinder or modify the arrangement, location and extent of such ports or passages as may be found to give the best results and otherwise appear desirable without departing from the spirit of my invention.

9 is the piston provided with the usual rings 10, 11 is the connecting rod connected to the crank 12, 13 is a sleeve open at both ends and adapted to reciprocate within the cylinder 1 and surrounding the piston 9; the sleeve 13 is provided with inlet apertures 14, primary exhaust apertures 15, and supplementary exhaust apertures 16, which are adapted to register with the respective inlet and exhaust apertures in the cylinder; that is to say—the ports 14 in the sleeve 13 upon the reciprocation of the latter and at certain periods of time and points of the reciprocation, will register with the apertures 6ᵇ, the ports 15 will in a similar manner at certain times and points register with the apertures 7ᵇ, and the ports 16 with the apertures 8ᵇ. The piston 9 is provided with apertures 17 opening into the explosion chamber at the top of the piston and enlarged at their lower portions as at 18 for a purpose explained later. 19 is a lug on the lower portion of the sleeve 13 engaged by a link 20 connected to the crank 21 by which the sleeve 13 is reciprocated. 22 is a gear wheel on the shaft carrying the crank 21 which meshes with the gear wheel 23 carried on the main shaft.

26 is an annular groove or recess extending around the piston into which the passages 17 open at their lower end 18 and by which means the gases are enabled to pass through all the ports 16 all around the sleeve when the piston is at such points that the groove 26 is over the ports 16 (see Figs. 1, 4, and 13).

Throughout the respective views the cranks 12 and 21 will be understood to revolve respectively in the direction of the arrows 24 and 25, though it should be understood that I do not limit myself to the particular means or method illustrated here in preference for operating the sleeve, as this may be accomplished by other suitable means. Nor is it essential that either crank 12 or 21 should revolve in the directions illustrated for convenience as both may revolve in the same or either direction, or one may revolve in one direction and the other in another, though it is essential that the same ratio be preserved between the two, that is to say one shall revolve twice as fast as the other, as for instance the crank 12 revolves and piston 9 reciprocates twice while the crank 21 revolves and the sleeve reciprocates once.

The operation of my device is as follows; referring to Fig. 5, when the charge of gas in the explosion chamber is fired all ports are closed, when the piston 9 reaches the point shown in Fig. 6 nearly at the bottom of the working stroke, the crank 21 has so far moved the sleeve 13 upward that the ports 15 in the sleeve 13 have just begun to open into, or communicate with the primary exhaust orifices 7 in the cylinder 1, so that the burned gases begin to escape through the said ports 15 and orifices 7: when the sleeve 13 has risen to the point shown in Fig. 1, the ports 15 register exactly with the apertures 7ᵇ so that the burned gases have free passage out into the exhaust space 7ª and thence out through the exhaust orifice 7, see Fig. 3. The motion continuing, the ports 15 pass the orifices 7 (see Fig. 7) and a moment later the upper lip of the annular groove 26 on the piston into which the passages 17—18 open begins to register with the lower edge of the orifices 16 in the sleeve, and as the movement continues the ports 16 in the sleeve also begin to register with the orifices 8ᵇ of the auxiliary exhaust (see Fig. 8) thus permitting the out flow of the residue of the burned gases through the passages 17—18 in the piston, through the ports 16 in the sleeve 13 and out through the orifices 8ᵇ in the cylinder.

During all this time, of course, the inlets 6ᵇ are closed by the sleeve 13, and just before the piston reaches the top of its stroke the orifices 18 and annular groove 26 are closed by the sleeve 13, and ports 16 in the sleeve are closed by the wall of the cylinder. (See Fig. 9.)

When the piston begins to move over the center and down on its suction stroke all exhaust orifices are closed and the inlet ports 14 in the sleeve begin to register with the inlets 6ᵇ in the cylinder and the fresh gas is drawn in to the explosion chamber.

Because of the fact that the angular movement of the crank is now at its greatest while the angular movement of the crank 21 is now at its least, being practically on its dead center, the inlet orifices 6ᵇ in cylinder and ports 14 in sleeve fully register and are wide open, (see Fig. 10) and remain practically so until the piston 9 has reached more than three quarters of its downward stroke.

As the crank continues to revolve the piston next commences its compression stroke see Figs. 11—12, all ports are closed and remain so, either because of the fact that the ports in the sleeve do not register with the orifices in the cylinder or because the piston itself covers the ports that are open during that portion of the cycle. On completion of the compression stroke the whole series of operations is ready to be repeated.

It will be seen that my device permits the charge to be drawn in through practically the entire downward stroke of the piston thus permitting a larger live charge to be drawn in. It will also be seen that I accomplish my exhaust in and by two separate and consecutive operations, the auxiliary exhaust remaining open until almost the very last movement of the piston and just before the inlet opens for the new charge, while the primary exhaust begins to open at such a time as to give the burned gases ample time to escape without detracting from the efficiency of the engine.

It will be understood that the particular settings of sleeve moving mechanism relative to the working crank may be varied so as to vary somewhat the times of gas admission and exhaust,—and that the relative position and size of arrangement of the gas inlets and exhaust ports both in sleeve, piston and cylinder may also be varied from the illustration without departing from the spirit of my invention which I have here shown in preferred and illustrative form.

Where I have referred to the location of the inlet and exhaust ports, passages and orifices as being above or below each other,— or in different horizontal planes I have had in consideration a vertical engine; and it will be understood that where my invention is applied to a horizontal engine or one set at an angle to the vertical, the planes might not be horizontal but would be successive relative to the actual movement of the piston and sleeve.

Nor do I limit myself otherwise to the precise form or arrangement or proportion of parts illustrated, as these may be modified without departing from the spirit of my invention but what I do claim and desire to protect by Letters Patent is,—

1. In an internal combustion engine, a cylinder having in its walls an annular chamber, a gas inlet communicating therewith, and orifices communicating with the interior of the cylinder; an annular chamber located below the inlet chamber, an exhaust outlet communicating therewith, and orifices communicating with the interior of the cylinder; another annular chamber below the last mentioned chamber, a secondary exhaust outlet communicating therewith, and orifices communicating with the interior of the cylinder; a sleeve within said cylinder adapted to reciprocate axially therein provided with ports adapted to register with the inlet orifices in the cylinder, and ports adapted to register with the different exhaust orifices in the cylinder, all located in different horizontal planes; a working piston adapted to reciprocate axially within said sleeve, provided with an annular space or groove, and with one or more passages communicating between the annular groove and the explosion chamber at the top of the piston, whereby upon the reciprocation of the sleeve and piston in the direction of their axes the inlet ports in the sleeve will register with the inlet orifices to permit the inlet of gas, the upper exhaust ports in the sleeve will register with the upper exhaust orifices to secure a primary exhaust, the lower exhaust ports in the sleeve will register with the lower exhaust orifices to provide a secondary exhaust when the annular space on the piston, the lower exhaust ports in the sleeve and the secondary exhaust orifices are in line.

2. In an internal combustion engine, a cylinder having in its walls an inlet orifice, a primary exhaust orifice and a secondary exhaust orifice in different horizontal planes; a sleeve adapted to reciprocate axially in the cylinder and provided with an inlet port adapted to register with the inlet orifice in the cylinder, a primary exhaust port adapted to register with the primary exhaust orifice in the cylinder, a secondary exhaust port adapted to register with the secondary exhaust orifice in the cylinder; and a piston within the sleeve provided with a passage communicating with the explosion chamber and adapted to permit the passage of burned gases into the secondary exhaust when it and the secondary exhaust orifices and ports register.

3. In an internal combustion engine, a cylinder having in its walls an inlet orifice, a primary exhaust orifice, and a secondary exhaust orifice all in different horizontal planes; a sliding sleeve within said cylinder provided with ports adapted to register upon the axial reciprocation of the sleeve successively with the inlet, primary exhaust and secondary exhaust orifices; a piston provided with passages opening into the explosion chamber and adapted to register with the secondary exhaust ports in the sleeve and secondary exhaust orifices in the cylinder, during the reciprocations of the sleeve and piston.

4. In an internal combustion motor, a cylinder provided with inlet and outlet ports; a sliding sleeve within said cylinder provided with ports adapted to register with the ports of the cylinder; a piston provided with an external annular space adapted to register with the outlet ports of the sleeve; and a passage connecting said space with the explosion chamber.

5. In an internal combustion motor, a cylinder provided with inlet and outlet ports; a sliding sleeve within said cylinder provided with ports adapted to register with the ports of the cylinder; a piston provided with a passage adapted to communicate between the explosion chamber and the outlet ports.

ROBERT BARBOUR.

Copies of this patent may be obtained for five cents each, by addressing the "Commissioner of Patents, Washington, D. C."